Oct. 8, 1935.  P. L. LEVITRE  2,016,443
WEIGHING AND BAGGING MACHINE
Filed Feb. 14, 1934  3 Sheets-Sheet 1

INVENTOR,
Pius L. Levitre,
BY
Frank E. Haskell
ATTORNEY.

Oct. 8, 1935.  P. L. LEVITRE  2,016,443
WEIGHING AND BAGGING MACHINE
Filed Feb. 14, 1934   3 Sheets-Sheet 2

INVENTOR,
Pius L. Levitre,
BY
Frank E. Haskell
ATTORNEY.

Oct. 8, 1935.  P. L. LEVITRE  2,016,443

WEIGHING AND BAGGING MACHINE

Filed Feb. 14, 1934  3 Sheets-Sheet 3

INVENTOR,
Pius L. Levitre,
BY
Frank E. Haskell
ATTORNEY.

Patented Oct. 8, 1935

2,016,443

UNITED STATES PATENT OFFICE 2,016,443

WEIGHING AND BAGGING MACHINE

Pius L. Levitre, Hatfield, Mass.

Application February 14, 1934, Serial No. 711,204

12 Claims. (Cl. 249—17)

This invention relates to apparatus for bagging onions, potatoes or other vegetables or fruits or any other similar material.

It is one of the objects of the invention to automatically weigh a predetermined quantity of material such as onions.

It is a further object of the invention to shut off the supply of material after the predetermined quantity has been weighed and to maintain the predetermined quantity segregated from the main supply until it is removed by bagging or otherwise.

Another object of the invention is to provide means for readily adjusting the apparatus to measure different quantities.

It is a still further object of the invention to provide "quick-acting" mechanism whereby any tendency to shut off the supply of material becomes cumulative and prevents the apparatus from remaining in an intermediate position which is neither open nor closed.

It is still another object of the invention to provide bagging means which acts to hold the shut-off means closed until the bagging operation is complete.

It is also an object of the invention to provide apparatus which is simple in operation and not likely to get out of order and which is inexpensive to construct.

It is also one of the objects of the invention to provide a simple means for halving or doubling the amount of material being weighed at each operation of the apparatus.

These and other objects of the invention will readily appear to those skilled in the art to which it appertains by a consideration of the following description of one embodiment thereof taken in connection with the accompanying drawings in which Fig. 1 is a plan view of one form of a weighing and bagging device embodying the invention;

Figure 1:
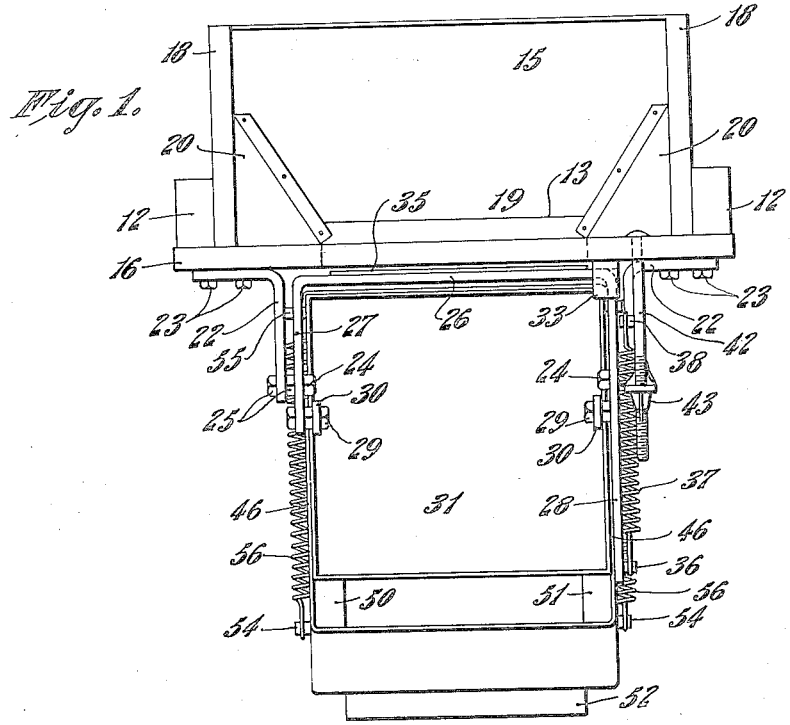
Figure 2:
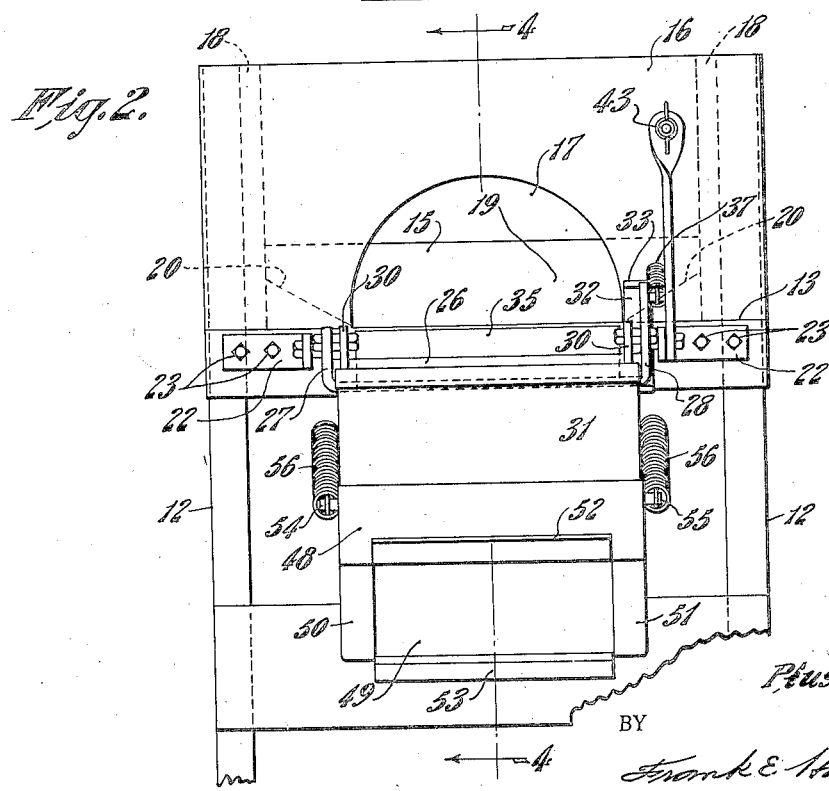
Fig. 2 is a front elevation of the device shown in Fig. 1.

Referring to the drawings more in detail, the reference character 11 indicates a pair of base pieces from which there extends upwardly a pair of supporting members 12. A cross piece 13 extends horizontally from one member 12 to the other. The upper edge of the cross piece 13 is beveled as indicated at 14 to correspond with the slope of a discharge chute to be presently described. A suitable member or board 15, positioned at just that angle which experiments show is the most desirable for the free flow of the vegetable being weighed and bagged, extends between the two supporting members 12 and backward away from the cross piece 13. A discharge guide 16 is provided which consists of a board positioned above the cross piece 13 and fastened to the front of the two supporting members 12. This discharge guide 16 has a discharge opening 17 in the lower edge thereof which opening is preferably of semi-circular form as shown in the drawings. A pair of end pieces 18 extend upwardly from the board 15 and rearwardly from the respective members 12 thereby providing a chute indicated generally by the reference character 19. To prevent pocketing of the material it is desirable that the corners of the chute be filled in and for this purpose a pair of sheet metal members 20 are provided. A reinforcing band 21 may also be provided at each end to strengthen the rear of the chute.

A weighing receptacle designated generally by the reference character 31 is indirectly supported by a pair of supporting brackets 22 each of which has two arms extending at right angles to each other. One arm of each bracket is secured to the cross piece 13 by bolts as indicated at 23. The other, outwardly extending, arm of each bracket carries a bolt for pivotally supporting a U-shaped member. The reference character 24 indicates generally this bolt and more particularly the head of the bolt. The outwardly extending arm of each bracket 22 is held rigidly between two nuts 25 on bolt 24. The U-shaped member designated by the numeral 26 has a short arm, shown at the left in Fig. 1, indicated by the reference character 27, and has near its end an aperture therethrough which operates as a bearing for the journal which is provided by that part of the pivot bolt which lies between the head 24 and the nut 25. The other arm 28 of the U-shaped member is somewhat longer and is similarly connected to the pivot bolt at the right hand side of the device, as seen in Fig. 1. For supporting the receptacle 31 a second pair of pivot bolts 29 are provided, one at the end of the short arm 27, and the other at the corresponding position in the long arm 28. These pivotally connect the U-shaped member to a pair of supporting straps 30 which are rigidly secured to the weighing receptacle 31.

A stop bracket 32 is bolted or otherwise secured to the cross piece 13 and has two outwardly extending arms 33 and 34 which lie in the path of the oscillating movement of the U-shaped member 26 and limits its travel in an upward and downward direction respectively. To the connecting strip of the U-shaped member is secured a flat piece or lip 35 which serves to obstruct the flow of material from the discharge chute 19 when it swings upward with the movement of the member 26.

Figure 6:
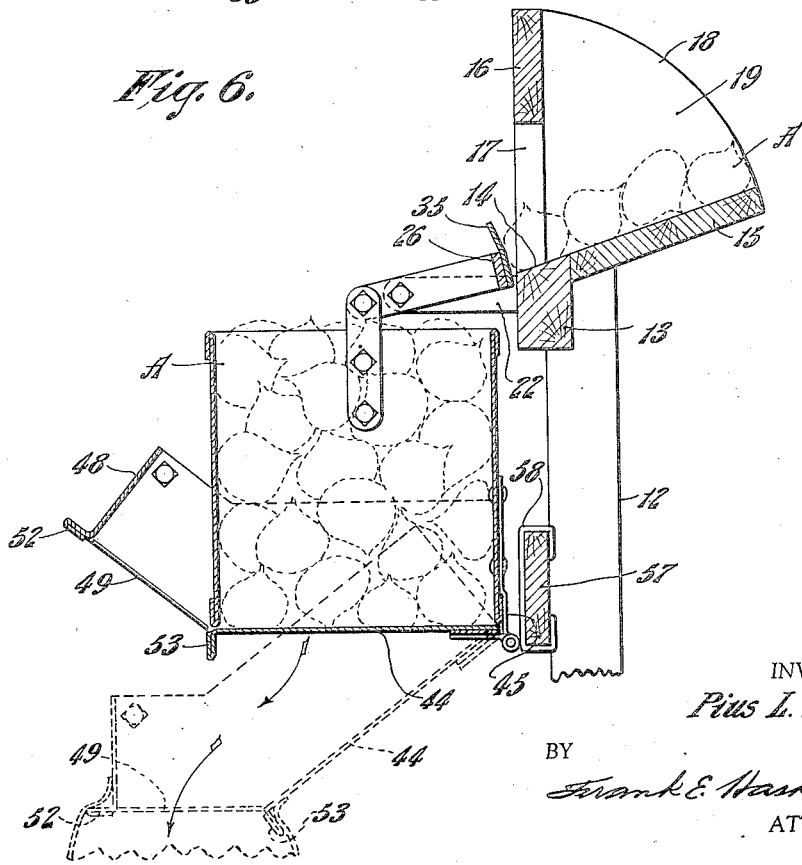
Fig. 6 is a vertical section corresponding to Fig. 4 with the difference that the weighing apparatus has closed off the supply, and it also shows the operation of the bagging apparatus in dotted lines.

At the forward end of the long arm 28 provision is made for securing a bolt 36 in one of two or more different positions. In the particular construction shown the arm 28 is provided with two apertures, one at the end of the arm in which the bolt 36 is shown as positioned and for which reason the aperture itself is not clearly shown, and one, indicated by the reference character 36a, which is positioned a little farther from the end of the arm 28. A tension spring 37 has one end pivotally connected to the bolt 36. The other end of the spring 37 is pivotally held by a bolt 38 secured in one of several different holes 39 provided therefor in the intermediate portion of a tension arm 40. The lower end of the arm 40 is pivoted by means of a bolt 41 to the right hand supporting bracket 22. The upper end of the arm 40 has an aperture therethrough in which is positioned a threaded rod 42, such as a carriage bolt, carried by the discharge guide 16. A wing nut 43 is threaded onto the rod 42 and fixes the outward position of the arm 40. Because this arm is adjustable in position the tension of the spring may be readily adjusted and the device accurately calibrated. The weighing receptacle 31 preferably has its four vertical walls in the form of a rectangle. The bottom side may be like an ordinary box or it may, as shown in the drawings, be combined with apparatus suitable for bagging the onions or other material after they have been weighed. The receptacle 31 is shown as provided with a movable bottom 44 which is pivotally connected with the vertical back wall of the receptacle 31 by means of a hinge 45. The bottom 44 is also provided with vertically extending sides 46 which are positioned outside the corresponding sides of the receptacle 31. These sides 46 may be secured to the bottom by any suitable means or they may, as in the construction shown, be formed out of the same sheet material from which the bottom is formed. The sides of the bagging apparatus which are secured to the bottom 44 also extend forwardly and outwardly and also upwardly somewhat as indicated at 47 and these extensions of the sides are connected by a portion 48. The bottom portion of the extension which lies in an upwardly extending as well as forwardly extending plane is provided with an aperture 49 which is nearly the full size of the extension although there may be end portions 50 and 51 which close the bottom for a short distance at each end. Two of the edges of the aperture 47 are preferably provided with extending lips 52 and 53 which may be conveniently bent up out of the sheet metal from which the bottom and connecting portion are formed. These lips are adapted to assist in holding the bag in position during the bagging operation. (See Fig. 6).

The bagging apparatus is provided at the upper forward corner of each side 46 with a bolt 54 and the rearward upper corner of each side of the weighing receptacle 31 is provided with a similar bolt 55. A tension spring 56 is provided at each side of the apparatus and is positioned between the bolt 54 at one end and the bolt 55 at the other end.

A second cross piece 57 is provided below the first cross piece 13 and extends between the supporting members 12. This cross piece 57 is provided with a runner 58 which may be in the form of a wire wrapped around the cross piece. The position of the parts is so chosen that the receptacle 31 or more specifically the hinge 45 which is secured to the receptacle slides up and down against the runner 58 as the apparatus is operated.

Figure 3:
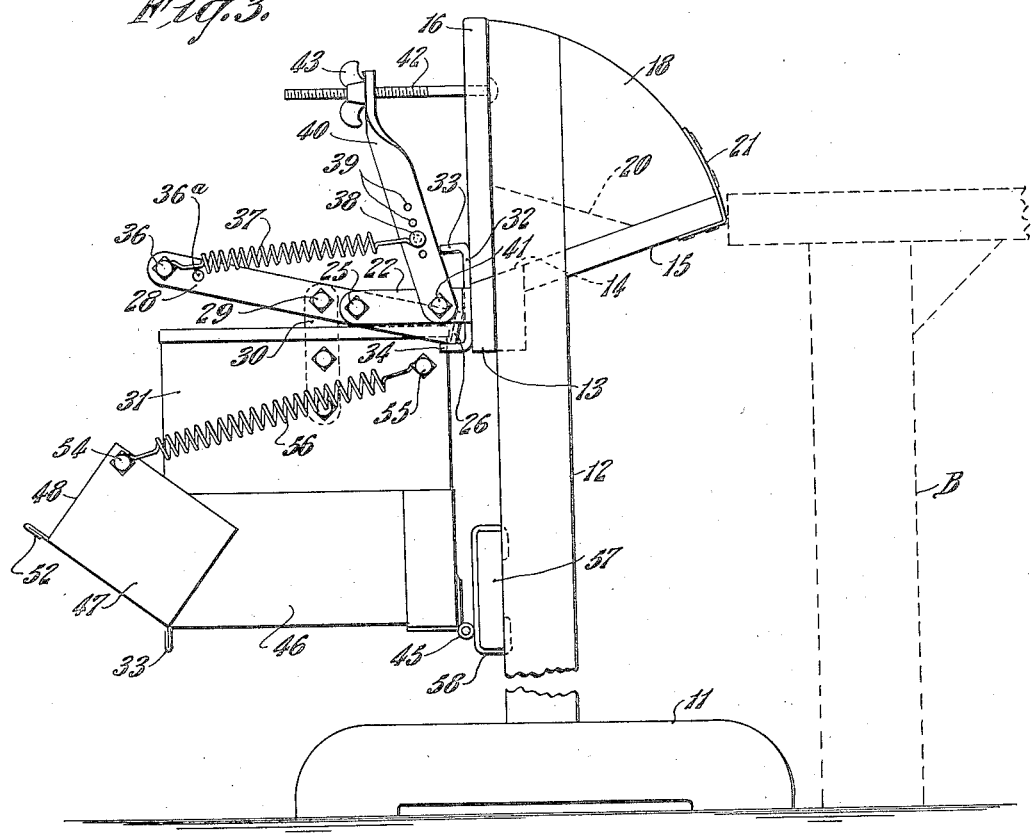
Fig. 3 is a side elevation of the same device.
Figure 4:
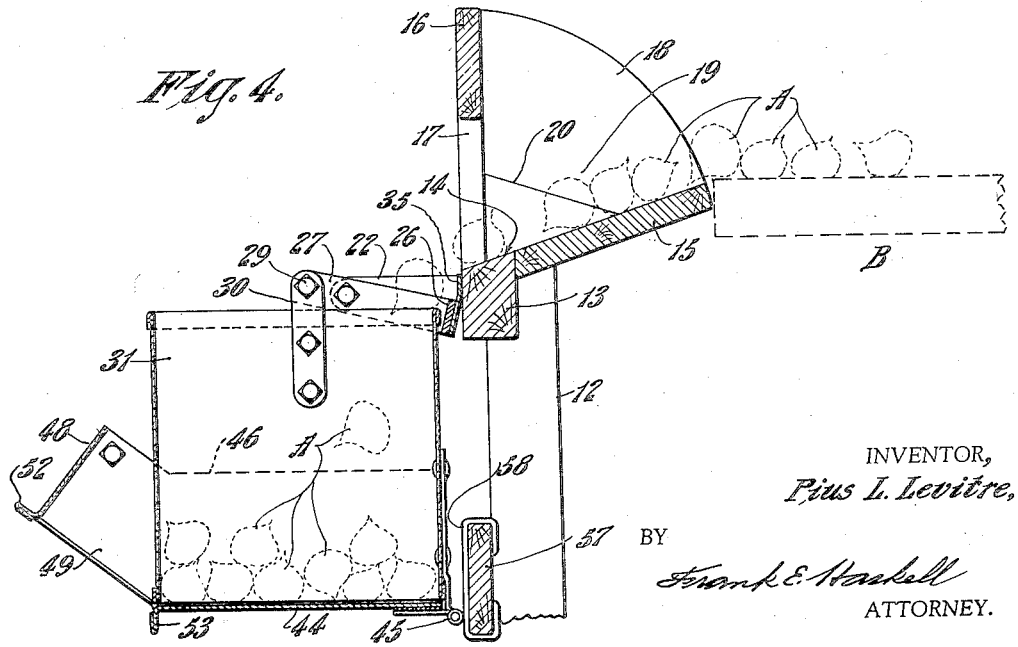
Fig. 4 is a vertical section taken on the line 4—4 of Fig. 2 and corresponds to the elevation shown in Fig. 3.

In operation whatever material, such as onions, indicated in dotted lines and having applied thereto the reference character A, is being weighed, is supplied by some suitable means, such as screening apparatus shown diagrammatically by dotted lines in Figs. 3 and 4 and indicated by the reference character B.

Figure 5:
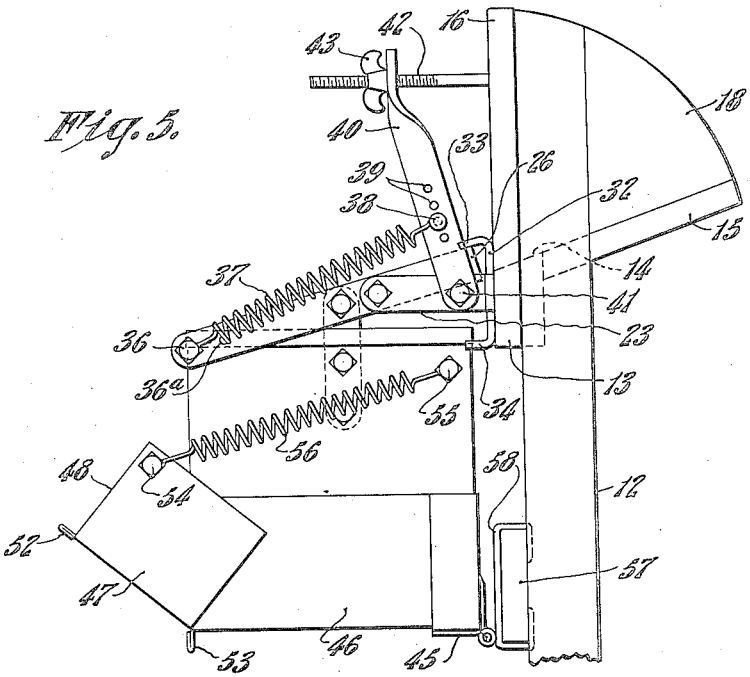
Fig. 5 is a side elevation corresponding to Fig. 3 with the difference, however, that the weighing apparatus has closed off the supply.

Starting with the device empty, the onions pass down the chute 19 and drop into the weighing receptacle 31. This is best illustrated in Fig. 4. When a sufficient quantity of onions, usually about 10 pounds, has passed into the receptacle 31 the weight of the onions will operate to move the receptacle 31 downward against the force of the spring 37. This spring 37 is stretched still further because the movement of the receptacle 31 downward moves the bolt 36 farther from the bolt 38 as will be seen by comparing Figs. 3 and 5 which show the parts in the two different positions. It will also be noted that the leverage, which is proportional to the distance between the line of action of the spring and the pivot 29, with which the spring 37 acts on the arm 28 is decreased as the weighing receptacle 31 moves downward. This makes it difficult to move the apparatus into an intermediate position since if the force of the weight of the onions is sufficient to start the weighing receptacle 31 downward the constantly decreasing leverage of the spring 37 against which it has to act makes it certain that the complete operation will take place.

It should also be noted that the calibration of the apparatus or adjustment for operation at different weights can be readily changed in four different ways. The tension of the spring 37 can be adjusted by means of the wing nut 43. The tension of the spring can be changed by placing the bolt 38 in a different hole 39. Also a spring of a different length or tension can readily be substituted. And finally the positions of the two apertures for the bolt 36, one aperture being the one in which the bolt is shown as positioned and the other aperture being indicated at 36a, are so chosen that the changing of the bolt from the outer position to the inner position will reduce the capacity just one-half or some other simple and convenient ratio. For example, the apparatus is usually built for 10-pound bags when the bolt is in the outer position and will weigh 5-pound bags without any further adjustment when the bolt is in the inner position.

In moving into the lower position the receptacle 31 causes a portion of the U-shaped member 26 to move upward with the flat piece or lip 35 passing into the path of the moving onions and preventing any further flow thereof. It is obvious that the downward movement of the receptacle 31 due to the weight of the onions on the one hand and the upward movement thereof due to the tension of the spring 37 on the other hand are both limited by the arms 33 and 34 of the stop bracket 32.

In bagging the onions a bag is slipped over the lips 52 and 53 and the bottom 44 and connected parts are pressed downward against the action of the spring 56 so that the onions are free to flow into the bag. During this part of the operation the force necessary to overcome the tension of the springs 56 exerts a sufficient downward force on the bolts 55 and the receptacle 31 to which they are secured so that the receptacle 31 is held in the lower position even after the onions are removed and their weight for that purpose is no longer effective.

After the onions have been discharged into the bag and the bottom is released, the receptacle 31 will then move back into its upper position, the lip or gate 35 will move out of the path of the onions on the chute, and another bagful of onions may be measured into the receptacle 31.

It is to be understood that the foregoing description and the embodiment of the invention selected for that description are both for purposes of illustration only and various changes may be made therein without departing from the spirit and scope of the invention as defined in the subjoined claims.

I claim:

1. In a weighing device, a supporting structure having a discharge chute for the material to be weighed, said chute being positioned so as to discharge the material in a nearly horizontal partly downward direction, pivotal supporting means rigidly secured to said supporting structure and positioned away therefrom in the general direction of the discharging material, oscillatory means pivotally supported by said pivotal supporting means, a receptacle carried by said oscillatory means at a portion thereof positioned farther away from the discharge end of said chute than the pivotal support of said oscillatory means, means carried by said oscillatory means at a portion thereof adjacent to the discharge end of said chute for moving into the path of the discharging material and for obstructing the flow of material from said chute when the weight of the receptacle and material therein depresses the opposite end of the oscillatory means, and means for resisting the downward movement of said receptacle until a predetermined amount of material has been discharged into said receptacle.

2. In a weighing device, a supporting structure having a discharge chute for the material to be weighed, supporting brackets secured to said structure below and at each side of said chute and extending outwardly therefrom, an oscillatory member pivotally supported at the outer ends of said brackets, a receptacle positioned in the path of the material from said chute and pivotally supported from said oscillatory member at a greater distance from the supporting structure than the pivotal support of the oscillatory member itself, resilient means extending from said supporting structure and tending to hold the outer portion of said member in an upper position, and a cut-off lip secured to said oscillatory member adjacent to the discharge chute whereby a downward movement of the receptacle due to the weight of the material overcoming the force of the resilient means will also move the lip upward into the path of the discharging material and obstruct further flow thereof.

3. In a weighing device, a supporting structure having a discharge chute for the material to be weighed, said chute being positioned so as to discharge the material in a nearly horizontal partly downward direction, a pair of supporting brackets extending outwardly from said structure in the general direction of the discharging material, a U-shaped member having each of its arms pivotally supported at an intermediate portion of its length by the outward end of one of said brackets and so positioned that the connecting portion of said U is adjacent and below the discharge end of said chute, a receptacle carried by the outer ends of the arms of said U-shaped member, a lip secured to the connecting portion of said U for moving into the path of the discharging material and for obstructing the flow thereof.

4. In a weighing device, a supporting structure, a U-shaped member pivotally supported from said supporting structure at a point on each arm of said member intermediate its length, a receptacle pivotally supported by said arms at points positioned outwardly from the supporting structure beyond the points where the U-shaped member is itself supported, one of the arms of said U-shaped member being extended to provide for the attachment of a tension spring, and a tension spring having one end pivotally connected with the extension of said arm and having the other end pivotally supported from the supporting structure at a point slightly above the point where the U-shaped member is supported from the supporting structure.

5. In a weighing device, a supporting structure, a U-shaped member pivotally supported from said supporting structure at a point on each arm of said member intermediate its length, a receptacle pivotally supported by said arms at points positioned outwardly from the supporting structure beyond the points where the U-shaped member is itself supported, one of the arms of said U-shaped member being extended to provide for the attachment of a tension spring, a tension arm having one end pivotally carried by said supporting structure and the other end having means for adjusting its position, and a tension spring having one end pivotally connected with the extension of the arm of said U-shaped member and the other end pivotally connected to the tension arm at a point intermediate its two ends.

6. In a weighing device, a pivotally supported arm, a receptacle for the material to be weighed connected with said arm so that the weight of the receptacle tends to move said arm about its pivotal point, and a tension spring attached to said arm and tending to move the arm in an opposite direction, the line of force of said spring making an acute angle with a line drawn between its point of attachment to said arm and the pivotal point of said arm whereby the downward movement of said receptacle causes a substantial decrease in the leverage of said spring and gives the operation of the mechanism a "quick-acting" effect.

7. In a weighing device, a pivotally supported oscillatory member, a receptacle supported by said member and movable therewith into an upper and a lower position, a bolt removably positioned in an aperture in said member to provide one of two separate adjustments for the capacity to be weighed, and a tension spring acting on said bolt and said member to hold the receptacle in its upper position, the line of force of said spring making an acute angle with a line passing through the pivotal point of said member and said bolt, said member having a second aperture nearer the pivotal point whereby the length of the spring and its tension may be changed without substantially changing the leverage through which it acts to provide a second adjustment for the capacity of the device which may bear a simple ratio to said first-named adjustment.

8. In a weighing device, a supporting structure, a pair of brackets extending outwardly therefrom, a U-shaped member pivotally mounted on said brackets, a receptacle carried by said member, a tension spring having one end attached to one of the arms of said member, a tension arm pivotally supported at one end on one of said brackets and having means at its other end for adjusting its position, said arm having a plurality of apertures intermediate the two ends for the adjustable reception of a bolt for the other end of said spring.

9. In a combined bagging and weighing device, a supporting structure having a discharge chute for the material to be weighed and bagged, a receptacle positioned in the path of the material from said chute, a pair of pivotally supported oscillatory arms from which said receptacle is supported, means carried by said arms for obstructing the flow of material from said chute when said receptacle is in its lower position, resilient means tending to hold said receptacle in its upper position, a combined closure and discharge chute hingedly connected to the bottom of said receptacle, resilient means between said closure and receptacle tending to hold the closure against the receptacle when it is being filled and which tends to hold the receptacle down and the obstructing means in the path of the discharging material from the first-named discharge chute when the closure is pressed open for bagging purposes.

10. In a weighing and bagging device, a vertically movable receptacle for the material to be weighed and bagged, stop means for limiting the upward and downward movement of said receptacle, a chute for discharging material into said receptacle, means associated with said receptacle movable into the path of the discharging material with the downward movement of said receptacle, resilient means for holding said receptacle in its upper position until the weight of the material discharging thereinto has reached a predetermined value, a movable bottom for said receptacle hinged to one side of the receptacle, a bagging extension for said bottom at the opposite side of the bottom from the hinge and having a discharge opening therein, and resilient means tending to draw said receptacle and bottom together for the double purpose of yieldingly holding the bottom closed against the weight of the material and for exerting a downward force on the receptacle when the bottom is opened for removing and bagging the material whereby the receptacle is held in its lower position and the means associated therewith is maintained in the path of the material from the chute until the receptacle has been emptied.

11. In a weighing and bagging device, a supporting structure having a discharge chute for the material to be weighed and bagged, a pair of brackets extending outwardly from said structure, a U-shaped member pivotally supported by said brackets, a receptacle carried by said member positioned in the path of the material from said chute, a tension arm having its lower end pivotally supported by one of said brackets and its upper end adjustably positioned from the supporting structure and having a plurality of apertures positioned in the intermediate portion of said arm, a plurality of apertures near the end of one of the arms of said U-shaped member, a tension spring positioned between bolts positioned in the said apertures one in the tension arm and one in the arm of the U-shaped member, a combined bottom and discharge chute hingedly connected to said receptacle, resilient means between said bottom and receptacle tending to hold them together, said U-shaped member having a lip associated therewith for obstructing the flow of material from the first-named chute when the receptacle is in its lower position, and stop means secured to said supporting structure for limiting both the upward and downward movement of the receptacle.

12. In a weighing device, a supporting structure having a discharge chute, said chute being positioned so as to discharge the material to be weighed in a nearly horizontal partly downward direction, a horizontally disposed oscillatory member pivotally supported to oscillate about a horizontal axis perpendicular to the general direction of the discharging material and spaced away from the discharging end of said chute in the general direction of the discharging material, a receptacle carried by said oscillatory member at a portion thereof on the far side of the horizontal axis from said chute, a lip carried by said oscillatory member adjacent the discharging end of said chute, and means for resisting the downward movement of said receptacle until a predetermined amount of material has been discharged into said receptacle.

PIUS L. LEVITRE.